Figure 1:
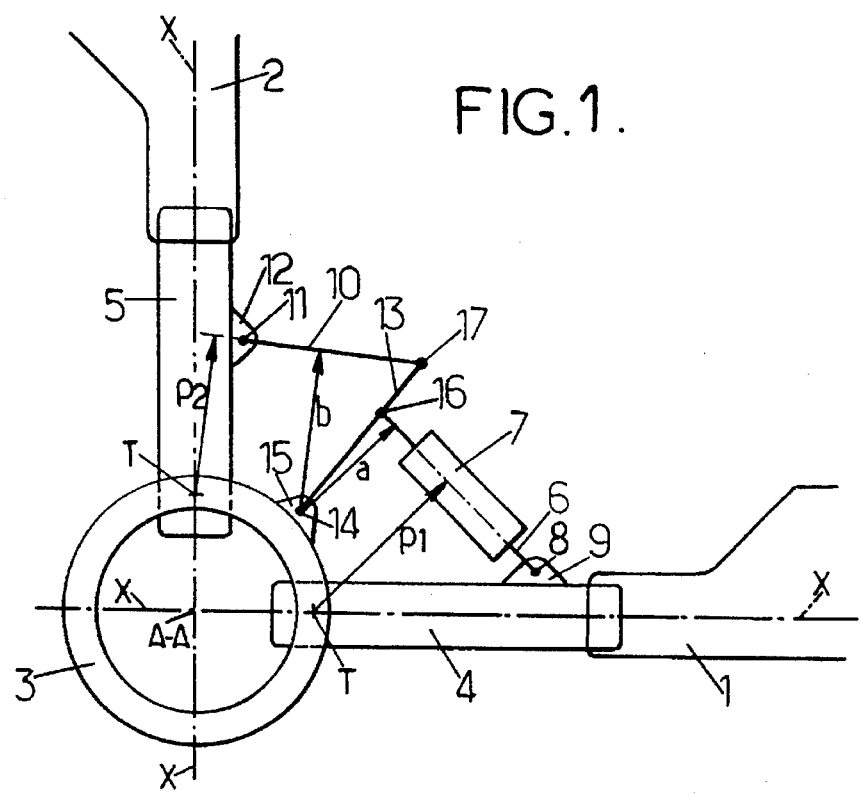

United States Patent [19]
Certain

[11] Patent Number: 5,636,970
[45] Date of Patent: Jun. 10, 1997

[54] DEVICE FOR DAMPING THE DRAG OF THE BLADES OF A ROTOR

[75] Inventor: Nicolas Certain, Aix en Provence, France

[73] Assignee: Eurocopter France, France

[21] Appl. No.: 644,846

[22] Filed: May 9, 1996

[30] Foreign Application Priority Data

May 12, 1995 [FR] France ................................. 95 05663

[51] Int. Cl.[6] ............................................. B64C 27/51
[52] U.S. Cl. ........................ 416/106; 416/107; 416/140
[58] Field of Search ..................................... 416/106, 107, 416/140, 141

[56] References Cited

U.S. PATENT DOCUMENTS

| | | |
|---|---|---|
| 2,494,985 | 1/1950 | Campbell. |
| 2,754,937 | 7/1956 | Buivid ........................................ 416/106 |
| 3,302,726 | 2/1967 | Stanley ....................................... 416/106 |
| 3,484,173 | 12/1969 | Rubicki ...................................... 416/107 |
| 4,304,525 | 12/1981 | Mouille ...................................... 416/107 |
| 4,915,585 | 4/1990 | Guimbal ..................................... 416/141 |

OTHER PUBLICATIONS

14th European Rotorcraft Forum—Paper n° 45—20/23 Sep. 1988.
"Design, Evaluation and proof-of-concept flights of a main rotor interblade viscoelastic damping system" by Guimbal Bruno.

*Primary Examiner*—John T. Kwon
*Attorney, Agent, or Firm*—Larson and Taylor

[57] ABSTRACT

The device comprises, between two blades and their members linking them to the hub, three levers articulated by ball joints to the members and to the hub, the two levers pivoting on the third one about axes of pivoting parallel to each other and perpendicular to the common plane passing through the centres of the ball joints. At least one of the levers comprises at least one drag damper.

12 Claims, 6 Drawing Sheets

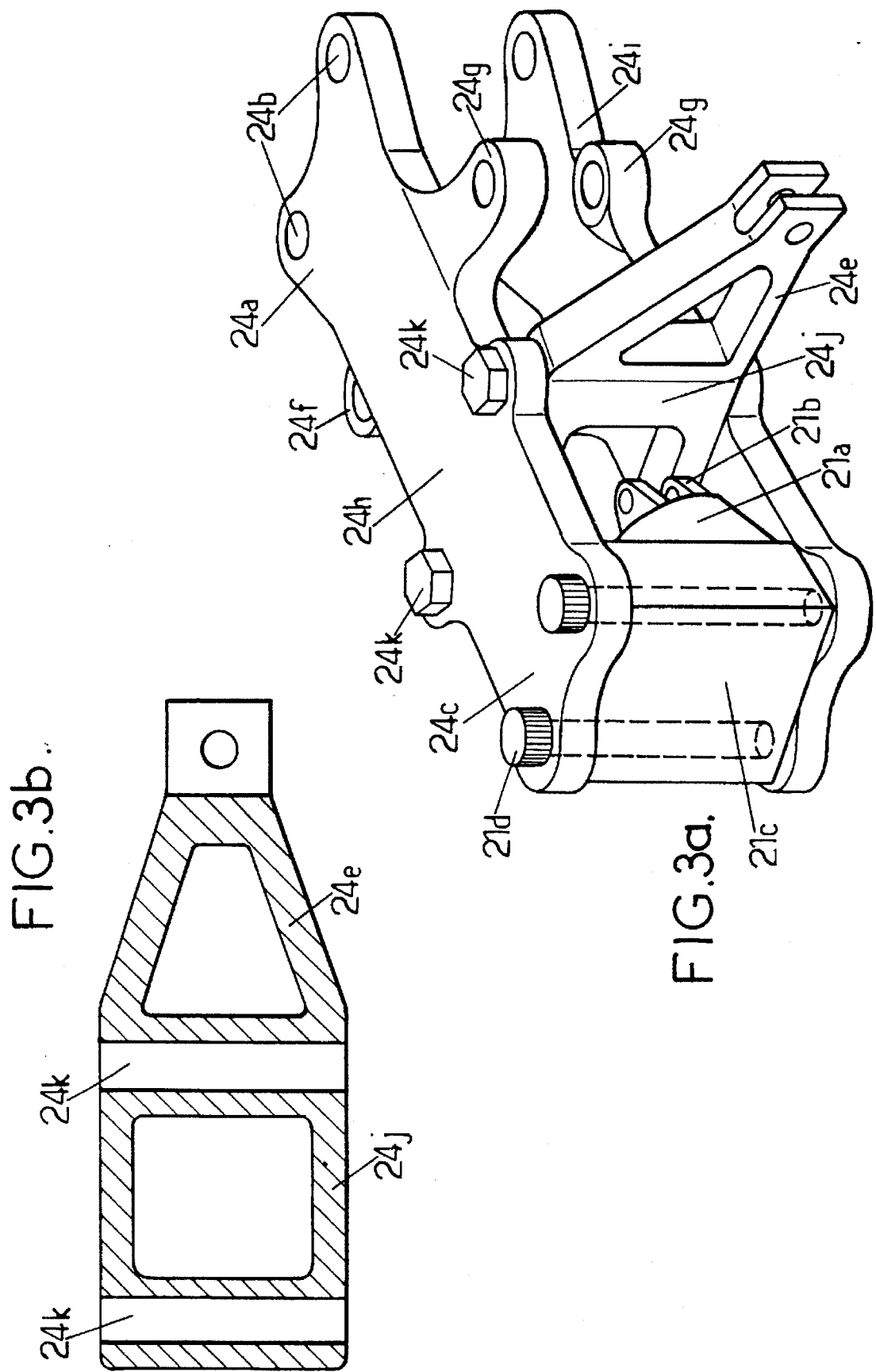

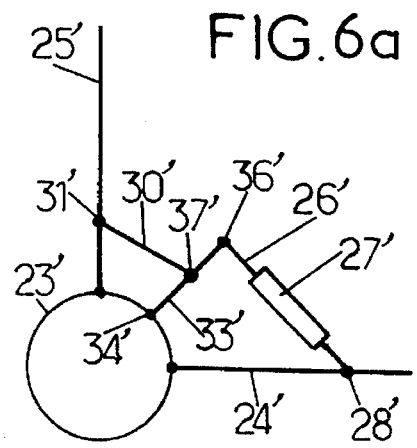
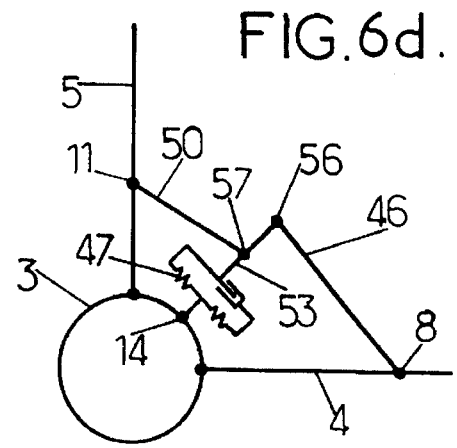
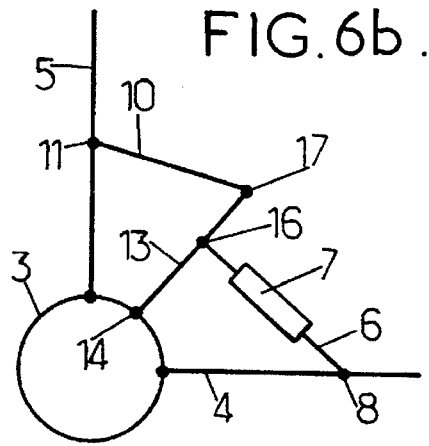
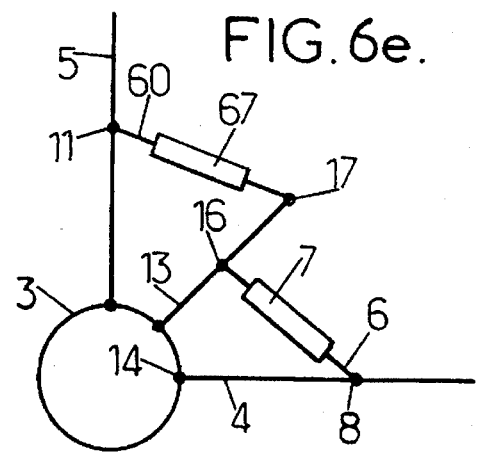
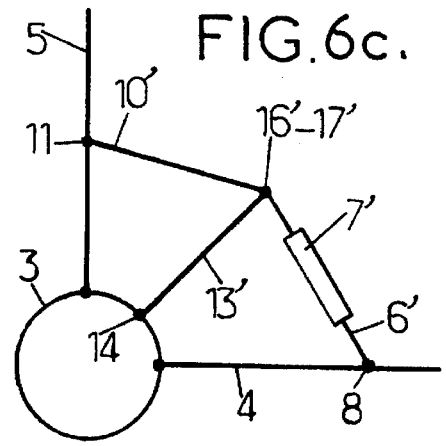

DEVICE FOR DAMPING THE DRAG OF THE BLADES OF A ROTOR

The invention relates to a device for damping the drag of the blades of a rotor of a rotorcraft, in particular of a helicopter main rotor or conventional tail rotor, the rotor being of the type having at least three blades each connected by a respective linking member to a rotor hub intended to he driven in rotation about an axis of the rotor.

To equip the rotors of rotorcraft, and in particular the rotors of helicopters, with drag dampers intended to damp out the angular deflection of the blades about their axis of drag, which is substantially parallel to the axis of rotation of the rotor, is known.

Numerous different embodiments of such dampers are known, especially hydraulic dampers, hydropneumatic dampers, and laminated dampers having at least one layer of viscoelastic material stressed between two rigid armatures, or including combinations of these various means.

These dampers often comprise elastic return means having given stiffness and given damping, for combating phenomena of resonance, particularly ground resonance and resonance of the transmission, which may occur in helicopters.

When the blades of a rotor are excited in drag, the blades are moved away from their position of equilibrium and may become unevenly distributed in the circumferential direction and create an imbalance by shifting the centre of gravity of the rotor away from the axis of rotation thereof. In addition, the blades moved away from their position of equilibrium oscillate about this position at a frequency $\omega_\delta$, which is the natural frequency of the blades in drag, also called first drag mode or natural drag mode.

If $\Omega$ is the rotational frequency of the rotor, then it is known that the fuselage of the helicopter is thus excited at the frequencies $|\Omega \pm \omega_\delta|$.

Resting on the ground via its landing gear, the fuselage of the helicopter constitutes a system with a mass suspended above the ground by a spring and a damper at each landing gear leg. The fuselage resting on its landing gear therefore has natural frequencies of vibration in roll and in pitch. There is a risk of instability on the ground when the frequency of excitation of the fuselage on its landing gear is close to the natural frequency of oscillation $|\Omega+\omega_\delta|$ or $|\Omega-\omega_\delta|$, which corresponds to the phenomenon known as ground resonance. In order to avoid instability, known practice involves seeking first of all to avoid the crossing of these frequencies and, if this crossing cannot be avoided, it is necessary to damp the fuselage sufficiently on its landing gear and also to damp the blades of the main rotor in their drag movement.

For a tail rotor, the resonance phenomenon to be avoided is the same, except that the natural modes of oscillation of the tail boom rather than the natural modes of vibration of the fuselage in roll and in pitch are the ones which should be taken into consideration.

As a consequence, the stiffness of the drag dampers for the blades of a main rotor has to be selected so that the natural frequency of the blades in drag is outside of a possible ground resonance zone, while at the same time having sufficient damping because, when the speed of rotation of the rotor crosses the critical speed, both when increasing in speed and when decreasing in speed, the blades have to be damped out sufficiently to prevent them from going into resonance.

For this reason, the drag dampers with elastic return means of given stiffness are also known as fre quency adaptors.

Their stiffness, their structure and their situation on the rotor have to be selected not only in order to combat the phenomenon of ground resonance, as explained hereinabove, but also to provide decoupling with regards to the setting of the power unit driving the rotor and to combat another resonance phenomenon known as transmission resonance. In this case, the frequency of the mode in question is $\omega_\delta$.

The most conventional arrangement for a drag damper is to articulate one end of the latter by a ball joint to one side of the corresponding blade or of a member for linking this blade to the hub, and to articulate the other end of the drag damper by another ball joint to a fixed point on the hub, usually situated between this blade and a neighbouring blade. The stiffness of the damper introduces an equivalent angular stiffness opposing the angular deflections of the blade with respect to the hub about its axis of drag. It is thus possible to increase the frequency of the natural mode of the blades in drag in order to be rid of the two aforementioned resonance phenomena, and in particular the phenomenon of transmission resonance.

However, the drawbacks of such a mounting method are of two types:
since the equivalent angular stiffness is proportional to the square of the lever arm between the damper and the axis of drag of the blade, that is to say the distance separating the axis of drag from the axis passing through the centres of the two articulation ball joints of the damper, and since this lever arm is short in such an arrangement, the stiffness of the damper has to have a high value in order to provide the frequency decoupling necessary to avoid ground resonance. The result of this is that the damper introduces a substantial static force;
there are technological hub configurations which do not make it possible to obtain a high enough equivalent angular stiffness to be able reliably to avoid ground resonance.

Another known practice is that of mounting drag dampers as inter-blade frequency adaptors. Each damper is articulated by one end, using a ball joint, to one side of a blade or of a member for linking this blade to the hub and by its other end, using another ball joint, to the opposite side of the neighbouring blade or the member for linking this neighbouring blade to the hub.

This arrangement allows the lever arms between the dampers and the axes of drag of the blades to be increased, but it also allows two dampers per blade to be involved in avoiding ground resonance. The stiffness of each damper can therefore be limited, and an advantage which stems from this is the low level of static force introduced by mounting each damper as an inter-blade adaptor. This arrangement is therefore highly favourable in combating ground resonance.

By contrast, this arrangement displays drawbacks which are:
complete absence of stiffness and of damping in combating transmission resonance, because the inter-blade dampers are not acted upon by in-phase displacements of the blades in drag, which are the type obtained in transmission mode;
it is practically impossible to adopt this arrangement of inter-blade dampers on a three-blade rotor because of the interference between the dampers and the levers for controlling the pitch of the blades.

Not one of the known conventional mounting methods set out hereinabove for frequency adaptors or drag dampers allows stability with regard to ground resonance and with regard to transmission resonance to be ensured reliably at the same time.

The problem on which the invention is based is of proposing a device for damping the blades of a rotorcraft rotor in drag which makes it possible to combine the advantages of those two arrangements of the state of the art which are set out hereinabove, without having their drawbacks.

One object of the invention is to propose a drag damping device which introduces two stiffnesses making it possible to solve the problems posed by ground resonance and by transmission resonance, and making these two stiffnesses easier to adjust.

Another object of the invention is to propose a drag damping device making it possible to afford a three-bladed rotor with the same advantages as an inter-blade frequency adaptor arrangement for combating ground resonance without the risk of interference with the blade pitch levers.

To this end, the invention proposes a drag damper device which makes it possible to fulfill the functions of both types of mounting of drag dampers or frequency adaptors of the state of the art, with simple and independent adjustment of the equivalent stiffnesses relating to the two modes of drag, namely the coplanar mode which poses a problem in the ground resonance phenomenon, and the in-phase mode which poses a problem in the transmission resonance phenomenon, the device additionally being perfectly suited to a three-bladed rotor.

To this end, the drag damping device of the invention is characterized in that it comprises, between two neighbouring blades of the rotor:

a first lever articulated by a first ball joint to said linking member of a first of the two blades, a second lever articulated by a second ball joint to said linking member of the second of the two blades, and a third lever articulated by a third ball joint to the hub between said linking members of the two blades and extending between said linking members and laterally towards the outside of the hub, the first and second levers being articulated to the third lever by a first pivoting link and a second pivoting link, respectively, about axes of pivoting parallel to one another and substantially perpendicular to the plane defined by the centres of the three ball joints, and at least one of the three levers comprising at least one drag damper for the said two blades.

During relative movements of the blades and of the hub, the axes of pivoting of this device make it possible to keep the three levers substantially coplanar in the plane defined by the centres of the three ball joints, this giving the advantage of a mechanically isostatic device.

Furthermore, for a given stiffness of each drag damper the choice, on the one hand, of the lever arms or distances between each of the first and second levers and the axis of drag respectively of the first and of the second of the two blades in quesion and, on the other hand, the lever arms or distances between each of the first and second levers and the centre of the third ball joint makes it possible in a simple and independent manner to adjust the equivalent angular stiffnesses of one blade with respect to the hub and of one blade with respect to another blade in order to act respectively against transmission resonance and against ground resonance.

Advantageously, to limit the overall size of the device and improve its operation, the first and second ball joints are held on the side, turned towards said third lever, of the respective linking member, said third lever extending substantially radially with respect to the axis of rotation of the rotor, to which the two axes of pivoting are substantially parallel.

The two pivoting links may be coaxial, that is to say that the two geometric axes of pivoting may be coincident, so that the first and second levers provide an inter-blade link, which can be adopted on a three-bladed rotor. In this case, the stiffness of a blade with respect to the hub is practically nil.

However, adjusting the two equivalent angular stiffnesses mentioned hereinabove may lead to the two axes of pivoting being radially offset with respect to each other and with respect to the axis of rotation of the rotor.

According to various possible alternative forms, the third lever may comprise a drag damper, and/or at least one of the first and second levers may comprise a drag damper which, in this case, is advantageously substantially straight. According to another alternative form, each of the first and second levers may comprise a substantially straight drag damper and the third lever may be a connecting rod. According to yet another alternative form, just one lever comprises a drag damper, the other two levers each being a connecting rod.

When the rotor is of the type in which each member for linking a blade to the hub is a member designed as a double clevis, having a radially outer clevis holding the corresponding blade by its blade root, and a radially inner clevis connected to the hub by a retaining and articulating means allowing angular deflections of said linking member with respect to the hub at least about an axis of drag of the corresponding blade, said linking member also bearing, as a lateral projection, a lever for controlling the pitch of the corresponding blade, the device is advantageously such that two lateral clevises project from the linking member, each one projecting respectively from one of its two sides and holding respectively one of the articulation ball joints for the articulation of a first lever and of a second lever, at least one of said lateral clevises being radially on the outside of said pitch lever with respect to the axis of rotation of the rotor, this making it possible to avoid interference between this pitch lever and the drag damper device.

Figure 4:
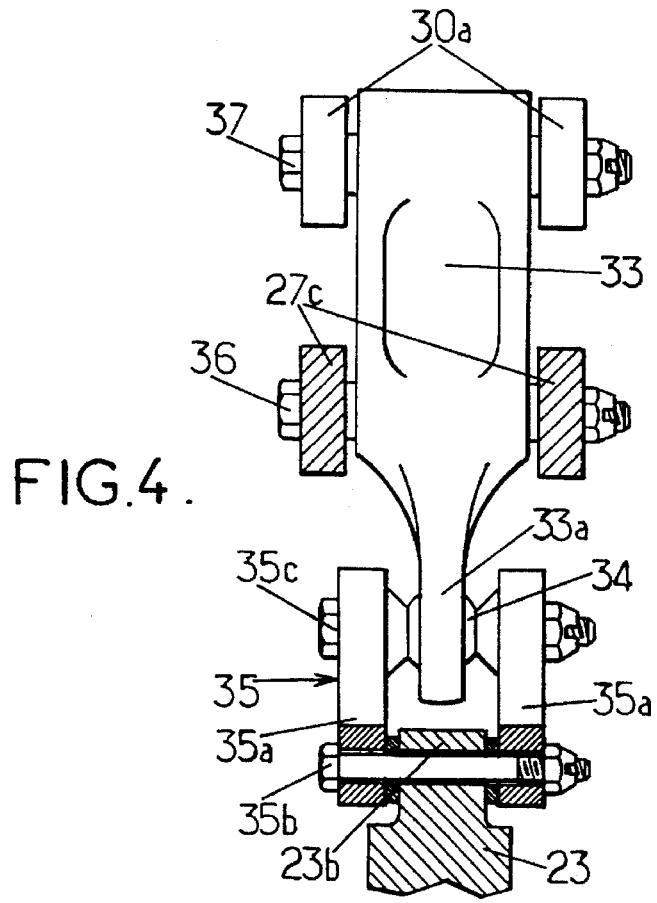
Figure 2:
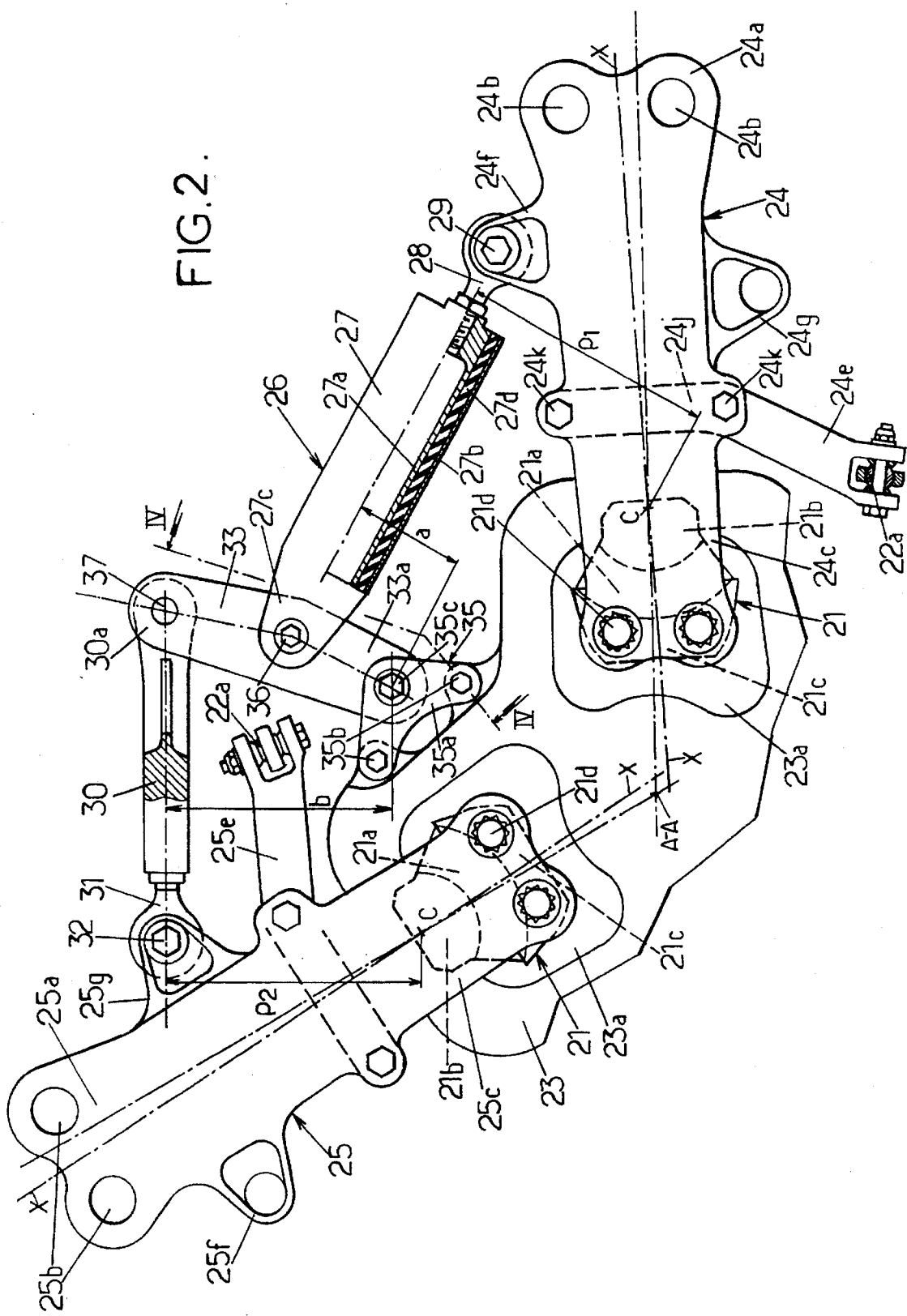
Figure 3:
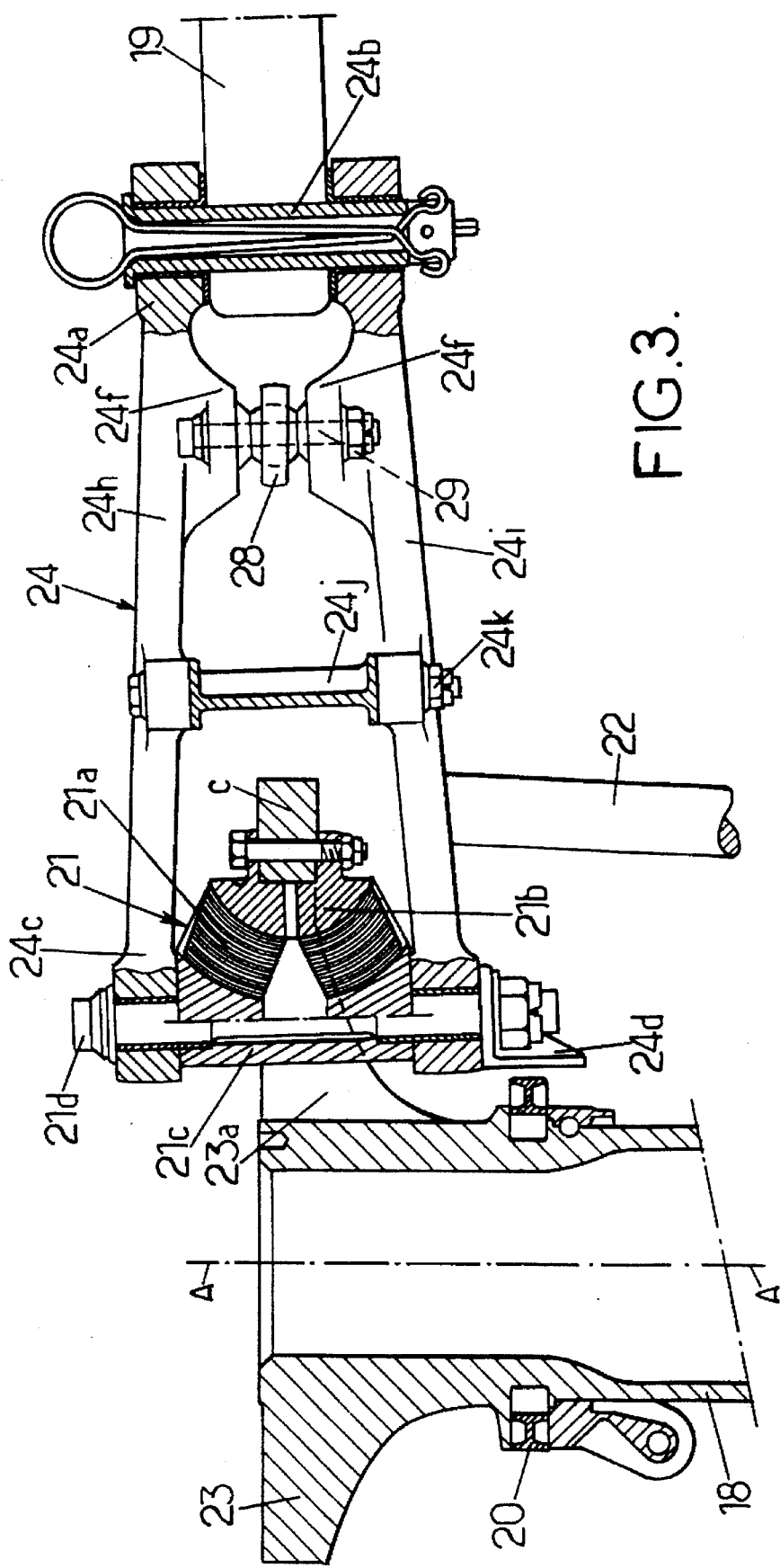
Figure 5:
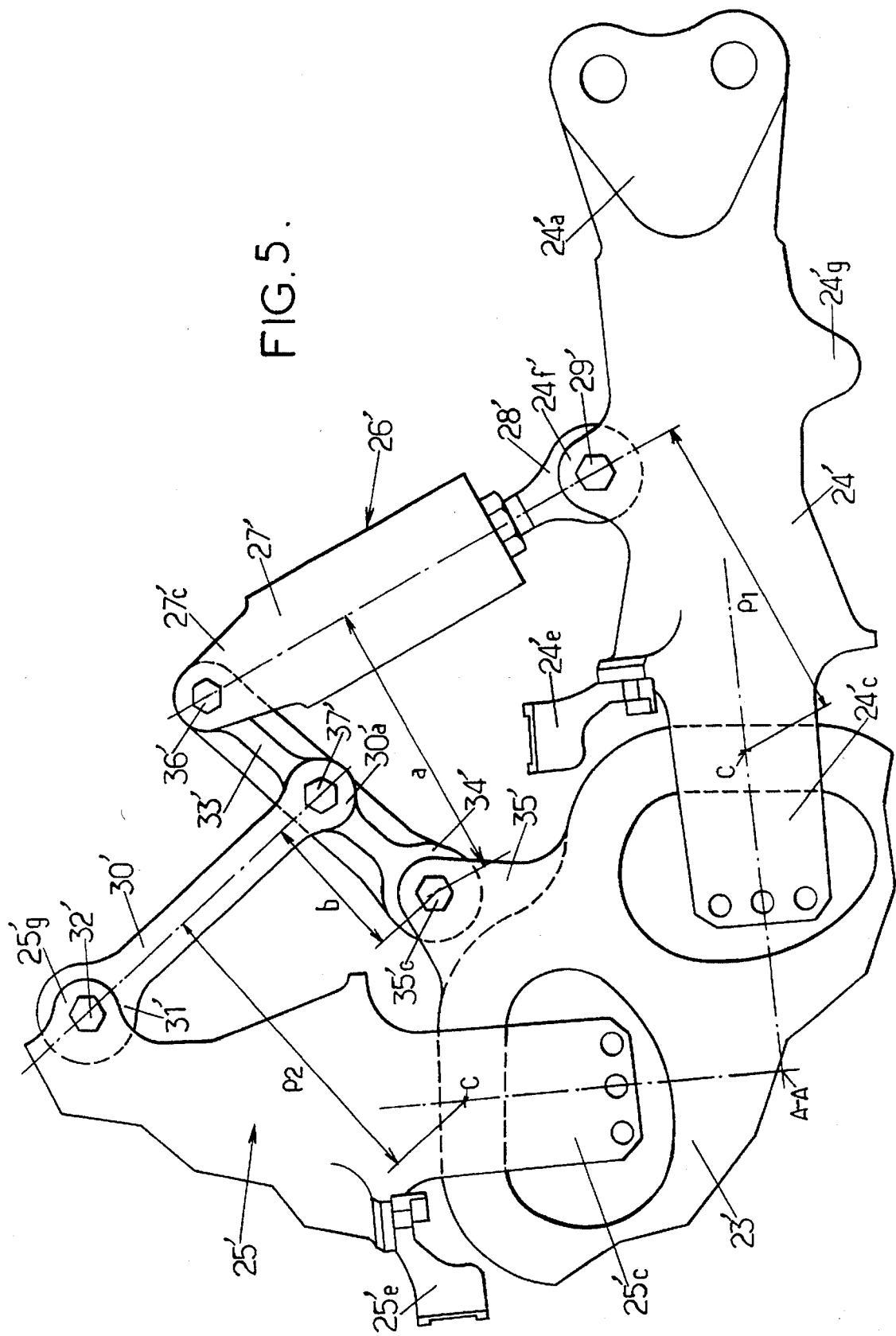

Other features and advantages of the invention will become apparent from the description given herein-below, with no limitation implied, of embodiments described with reference to the appended drawings in which:

FIG. 1 is a diagrammatic plan part view of a four-bladed rotor with a drag damping device, FIG. 2 is a view similar to FIG. 1 of an example of the head of a three-bladed rotor, represented without the blades but with the members for linking the blades to the hub, FIG. 3 is a view in part section of the rotor head of FIG. 2, on a plan perpendicular to the plane of this FIG. 2 and passing through the longitudinal axis of a blade-hub linking member, FIG. 3a is a diagrammatic perspective view of a linking member and of the corresponding articulation means, for linking and articulating a blade to the rotor head of FIGS. 1 and 2, FIG. 3b is a diagrammatic cross-section of a spacer piece with a pitch lever of the linking member of FIG. 3a, FIG. 4 is a view partly in side elevation and partly in section on IV—IV of FIG. 2, FIG. 5 is a view similar to FIG. 2 of a four-bladed rotor head, and FIGS. 6a, 6b, 6c, 6d and 6e are diagrams of various possible arrangements of the drag damping device on a four-bladed rotor, these arrangements also being suitable for any rotor with a number of blades greater than or equal to three.

The two neighbouring blades 1 and 2 of the four-bladed bladed rotor of FIG. 1, the other two blades of which are not represented, are each connected to the hub 3 of the rotor by a linking member 4 or 5.

The hub 3, represented in FIG. 1 as an annular plate, may be a cavitied plate as represented in FIGS. 2, 3 and 5 and described hereinbelow with reference to these figures, so as to house in its central opening or in the cavity corresponding to each blade, retaining and articulation means connecting a linking member, such as 4 or 5, to the hub 3 so as to allow angular deflections of a blade, such as 1 or 2, in pitch, about its longitudinal pitch-change axis X—X, in drag, about its axis of drag T [which is perpendicular to axis X—X and parallel to the axis A—A of rotation of the rotor about which the hub 3 is driven in rotation by a rotor shaft to which it is attached], and finally, in flapping, about an axis of flapping (not represented) perpendicular both to the pitch axis X—X and to the axis of drag T.

These retaining and articulating means, not represented in FIG. 1, may, for each blade, be a laminated spherical stop as represented in FIGS. 2 and 3 and described hereinbelow with reference to these figures, and for which the three axes, of pitch X—X, of drag T and of flap, come together at a point lying in the peripheral part of the hub 3 and corresponding to the geometric centre of the laminated spherical stop.

Each linking member 4 or 5 may be a forked root of the corresponding blade 1 or 2, this forked root extending on either side of the hub plate 3, to which it is connected by the aforementioned retaining and articulating means. However, it is also possible for each linking member 4 or 5, as represented in FIGS. 2, 3 and 5, to be a substantially radial member commonly called a cuff, the radially outer end of which is designed as an outer clevis for holding the root of the corresponding blade 1 or 2, and the radially inner end of which is designed as an inner clevis straddling the hub plate, to which this inner clevis is connected by the said retaining and articulating means.

The drag damper device for the blades comprises, between the two blades such as 1 and 2 of each pair of neighbouring blades of the rotor, an arrangement with three levers, three articulation ball joints and two pivoting links, in which arrangement at least one lever comprises at least one or consists of at least one drag damper incorporating elastic return means having a given stiffness and given damping, this arrangement now being described.

It comprises a first lever 6, the central part of which is designed as a drag damper 7 with built-in elastic return means and of a given stiffness, or frequency adaptor, and this lever 6 is articulated by a first ball joint 8 to a support 9 projecting laterally from the side of the linking member 4 which is turned towards the second blade 2. The arrangement also comprises a second lever 10 which, in this example, is a constant-length connecting rod articulated by a second ball joint 11 to a support 12 projecting from the side of the linking member 5 which is turned towards the first blade 1. The arrangement further comprises a third lever 13, also consisting of a constant-length connecting rod which extends substantially radially between the linking members 4 and 5 and is articulated by its radially inner end using a third ball joint 14 to a support 15 projecting radially outwards from the hub 3, between the linking members 4 and 5 and their respective means for retaining and articulating them on the hub 3. In addition, at its opposite end from the ball joint 8, the lever 6 is articulated to the lever 13 by a first pivoting link 16 and, similarly, the opposite end of the lever 10 from the ball joint 11 is articulated to this lever 13 by a second pivoting link 17 which, in this example, is radially outside the pivoting link 16, itself radially outside the ball joint 14 with respect to the axis A—A of the rotor.

The centres of the three ball joints 8, 11 and 14 define a single plane, and the pivoting links 16 and 17 have axes of pivoting which are parallel to each other and also substantially parallel to the axis of the rotor A—A these axes of pivoting being perpendicular to the plane defined by the centres of the ball joints. In this way, when the blades 1 and 2 pivot in drag, flapping and pitch, with respect to each other and/or with respect to the hub 3, the levers 6, 10 and 13 remain coplanar in this plane of the centres of the ball joints and the device is isostatic, the drag damper 7 being acted upon in tension or in compression depending on the amplitudes and directions of angular deflection of the blades 1 and 2 in drag.

If K is the stiffness of the straight damper 7, coaxial with the straight lever 6, if $\rho 1$ and $\rho 2$ are the lever arms respectively of the damper 7 and of the lever 6 with respect to the axis of drag T of the blade 1 and of the corresponding linking member 4, and of the straight lever 10 with respect to the axis of drag T of the blade 2 and of the corresponding linking member 5, that is to say if $\rho 1$ is the distance between the axis of the lever 6, passing through the centres of the articulations 8 and 16, and the axis of drag T of the member 4 to which the lever 6 is articulated, and if $\rho 2$ is the distance between the axis of the lever 10, passing through its articulations 11 and 17, and the axis of drag T of the member 5 to which this lever 10 is articulated, and finally if a and b are used to denote the lever arms or distances between respectively the axes of the lever 6 and of the lever 10 on the one hand and, on the other hand, the centre of the ball joint articulation 14 of the lever 13 on the hub 3, then calculation shows that the equivalent stiffness K0 involved in the transmission resonance problem (that is to say the equivalent angular stiffness opposing rotation, in drag, of a blade with respect to the hub, all the blades having an in-phase drag movement) is given by the formula (1):

$$K0 = K\left( \rho 1 - \frac{a}{b} \cdot \rho 2 \right)^2 \quad (1)$$

The equivalent stiffness K1 involved in the ground resonance problem (that is to say the equivalent angular stiffness opposing the rotation of a blade, in drag, with respect to the other blades) is given by the following formula (2):

$$K1 = K\left[ \rho 1^2 + \left( \frac{a}{b} \cdot \rho 2 \right)^2 \right] \quad (2)$$

for a four-bladed rotor, and by the formula (2'):

$$K1 = K\left[ \rho 1^2 + \left( \frac{a}{b} \cdot \rho 2 \right)^2 + \rho 1 \cdot \rho 2 \cdot \frac{a}{b} \right] \quad (2')$$

for a three-bladed rotor.

Through a suitable choice of the stiffness K and of the distances $\rho 1$, $\rho 2$, a, b, therefore by a suitable choice of the stiffness K of the damper 7 and of the positions of the ball joint articulations 8, 11 and 14 and pivoting articulations 16 and 17, it is possible simply and independently of one another to adjust the equivalent stiffnesses K0 and K1 in order to be rid both of the ground resonance and of the transmission resonance, and for this to be the case without the stiffness K having to be great, which makes it possible to limit the static forces in the damper 7.

It will be noted that if the levers 6 and 10 are articulated to the lever 13 at one and the same point thereon, that is to say if the pivoting links 16 and 17 are coaxial, their geometric axes of pivoting being coincident, and if the ball joints 8 and 11 are at the same radial distance from the axis A—A of the rotor, then a=b and ρ1=ρ2. This then amounts to an inter-blade configuration of drag damper or frequency adaptor for which the equivalent stiffness K0 is zero and the equivalent stiffness K1 is equal to 2Kρ² for a four-bladed rotor, 3 Kρ² for a three-bladed rotor, namely, if b is the number of blades, and according to N. M. SELA and E. ROSEN ("The influence of alternate inter-blade connections on ground resonance" in "Journal of the American Helicopter Society", July 1994), the equivalent stiffness K1 is given by the following formula (3):

$$K1 = 2\left(1 - \cos\frac{2\Pi}{b}\right) K\rho^2 \quad (3)$$

It will also be noted that if the articulation between the lever 6 and the lever 13 is shifted as far as the ball joint 14, then a=0, and this amounts to a conventional configuration of drag damper or frequency adaptor articulated between the member 4 for linking the blade 1 to the hub and this hub 3. In this configuration, K0=K1=K . ρ1².

The arrangement allows independent adjustment of the two stiffnesses K0 and K1 between the two configurations—inter-blade dampers and conventional dampers—analysed hereinabove.

Formulae (1), (2) and (2'), (3) remain the same as far as the damping calculations are concerned. All that is required is to replace K, K0 and K1 respectively by K', K'0 and K'1 in order to deduce therefrom the corresponding equivalent damping.

In the arrangement described, the damper 7 which introduces damping for stability and stiffness for changing the natural frequency of the blades in drag may have any appropriate structure whatsoever and may, for example, be a hydraulic damper, a hydropneumatic damper, a damper having a layer of elastomer or of viscoelastic material acted upon in shear between armatures, or with a combination of these various means.

In this device, it will also be noted that in transmission mode, the blades pivot in phase each about its axis of drag T so that all the dampers 7 of the device extend or retract because the amplitude of displacement of one end of each damper such as 7 is greater than that of the other end so that each damper is effective.

FIGS. 2 and 3 represent a three-bladed main rotor head, in which each blade (not represented) is connected to the hub 23 by a member hereafter referred to as connecting cuff 24 or 25 which is substantially radial and designed as a double clevis with a radially outer clevis 24a or 25a, between the two branches of which the root of the corresponding blade (as represented diagram-matically at 19 in FIG. 3) is held using two parallel pins (represented diagrammatically as 24b or 25b) and symmetric on either side of the longitudinal axis X—X of the cuff 24 or 25. The latter also has a radially inner clevis 24c or 25c, the two branches of which straddle the hub 23. This hub 23 is a horizontal plate (perpendicular to the axis A—A of the rotor) having, for each blade, a radial arm through which a cavity 23a passes axially, the hub 23 consisting of a single piece (see FIG. 3) with the top end of a rotor mast 18 driven in rotation about the axis A—A and around which is mounted, for each blade and beneath the hub plate 23, a bottom flap stop 20 made in the form known as a droop restrainer ring. Each cuff 24 or 25 is connected to the hub 23 by its radially inner clevis 24c or 25c which is held on the outer edge of the corresponding cavity 23a of the hub 23 by retaining and articulating means consisting of a laminated spherical stop 21 of known structure. This stop 21 comprises a central part 21a consisting of an alternating stack of rigid cups and of elastically deformable layers in the form of spherical caps, between a radially outer armature 21b bolted to the outer edge of the cavity 23a of the hub 23 and a radially inner armature 21c passing through the cavity 23a and fixed as a spacer piece between the branches of the inner clevis 24c or 25c by threaded studs 21d. These studs at the same time fasten, underneath the lower branch of the clevis 24c or 25c, a heel such as 24d which interacts with the bottom stop 20 opposite in order to limit the downward flapping of the blade and of the corresponding cuff 24 or 25. Each laminated spherical stop 21, housed in the corresponding cavity 23a, especially allows the angular deflection of the cuff 24 or 25 with respect to the hub 23 about three axes which are perpendicular in pairs and meet at the geometric centre C of the ball joint 21, situated in the radial edge of the hub 23. These three axes are the longitudinal pitch-change axis X—X, the axis of drag T, substantially parallel to the axis of the rotor A—A and the axis of flapping (not represented, perpendicular to the first two). In order to control the pitch of a blade and of the cuff 24 or 25 which bears it, the latter also has, projecting laterally, a pitch-control lever 24e or 25e bolted onto the cuff 24 or 25 and the free end of which is designed as a clevis retaining a ball joint 22a for the articulation of the upper end of a corresponding pitch-control rod 22.

This cuff 24 or 25 also has, projecting laterally from each of its sides, and radially outside the pitch lever 24e or 25e, a first lateral clevis and a second lateral clevis 24f and 24g or 25f and 25g, the second clevis 24g or 25g being laterally on the same side as the pitch lever 24e or 25e and radially closer to the latter than the first lateral clevis 24f or 25f projecting on the opposite side of the cuff 24 or 25.

Each cuff 24 or 25 may in effect have a tubular structure in its central part, between its two end clevises 24a or 25a and 24c or 25c. However, as clearly represented in FIGS. 3 and 3a in respect of the cuff 24, it may just as easily consist of two superimposed rigid plates 24h and 24i forming the opposite branches of the clevises 24a and 24c and held apart by the internal armature 21c of the stop 21 as well as by a central spacer piece 24j bearing the pitch lever 24e projecting laterally (see FIG. 3b) and to which the two plates 24h and 24i are fixed by threaded studs 24k. The upper plate 24h and the lower plate 24i each have, projecting respectively from one side and from the other, one of the two branches respectively of each of the lateral clevises 24f and 24g, as represented in respect of the clevis 24f in FIG. 3 and in respect of the clevises 24f and 24g in FIG. 3a. As in the preceding example, between the two cuffs 24 and 25 of each pair of neighbouring cuffs of the rotor head, the drag damper device comprises three levers 26, 30 and 33, the first of which is a drag damper 27 (partially in section in FIG. 2), and the second and third levers 30 and 33 of which are fixed-length connecting rods.

The damper 27 comprises a cylindrical internal armature 27a extended at one end by an end-fitting with a ball joint 28 held by a spindle 29 in the lateral clevis 24f of the cuff 24, and the damper 27 also comprises an external tubular armature 27b extended, at its opposite end to the ball joint 28, by a clevis 27c the two branches of which straddle the central part of the third lever 33 and are mounted in pivoting fashion thereon by means of a pivot spindle 36 parallel to the axis A—A and consisting of the screw of a screw-nut system for linking the damper 27 to the lever 33. Between its armatures 27a and 27b, the damper 27 also comprises a cylindrical tubular layer of elastomer 27d working in shear to provide damping with elastic return and a given stiffness. The second lever 30 is also equipped, at one end, with an end-fitting with a ball joint 31 held in the second lateral clevis 25g of the cuff 25 by a spindle 32, the opposite end of the lever 30 also being designed as a clevis 30a the two branches of which straddle the radially outer end of the lever 33 and are mounted in pivoting fashion thereon by a pivot spindle 37 parallel to the pivot 36 and also consisting of the screw of a screw-nut system for linking the lever 30 to the lever 33. The relatively thick part of the lever 33 on which the levers 26 and 30 are mounted in pivoting fashion (see FIG. 4) is extended radially inwards by a thinned end-fitting 33a bearing a ball joint 34 held in a clevis 35 projecting laterally outwards from the hub 23 and attached laterally to the periphery thereof. The clevis 35 consists of two small parallel plates 35a of substantially triangular shape with rounded corners, fixed by screw-nut systems 35b at two of their corners on either side of thinned appendages 23b projecting laterally from the hub 23 in the opening exhibited by this hub between its two radial arms to which the cuffs 24 and 25 are linked. The ball joint 34 is held between the third corners of the plates 35a by screw-nut system 35c. The bolts and screws constituting the pivot and retaining spindles 29, 32, 36, 37, 35b, 35c are parallel to each other and to the axis of the rotor A—A and are substantially perpendicular to the common plane defined by the centres of the three ball joints 28, 31 and 34. As in FIG. 1, the pivot 36 between the lever 26 and the lever 33 is closer to the axis A—A than the pivot 37 between the lever 30 and this same lever 33. However, in the example of FIG. 2, the latter lever has a shape equivalent to a slightly cranked lever because the pivots 36 and 37 and the ball joint 34 are not centred in the one same radial direction. This configuration makes it possible to shorten the lever 30, therefore to lighten it, whilst enveloping the pitch lever 25e without any risk of interference with it when the cuff 25 deflects in its pitch range.

The four-bladed rotor head of FIG. 5 is similar to the examples of FIGS. 2 and 3 as regards the linking of each blade to the hub by a cuff in the form of a double clevis, the linking of this cuff to the hub by a laminated spherical stop, the structure of the hub as a cavitied plate, and the mounting, between two neighbouring cuffs, of an arrangement with three levers, three ball joints and two pivoting links, and a drag damper built into one of the levers, so that the description will restrict itself to discussing the main differences between these two examples, assigning to the elements of FIG. 5 the same references as the similar elements of FIGS. 2 and 3, but followed by a prime symbol.

A first difference is that the first lever 26' with built-in drag damper 27' is pivoted by its end clevis 27'c and the pivot 36' on the radially outer end of the third lever 33' which is a straight connecting rod, whereas the second lever 30' is pivoted by its end clevis 30'a and the pivot 37' on the central part of the third lever 33', the radially inner end of which is articulated by an end-fitting with a ball joint 34' held by the spindle 35'c in the clevis 35' projecting substantially radially towards the outside of the hub 23' and as a single piece therewith. Another difference is that the lateral clevis 24'g or 25'g of the cuff 24' or 25' for articulating a second lever such as 30' is radially outside the other lateral clevis 24'f or 25'f for articulating a first lever such as 26'. The result of these differences is that the lever arms a and b respectively of the first and second levers 26' and 30' with respect to the centre of the third ball joint 34' are respectively greater than and less than the lever arms a and b of the example of FIG. 2, without the lever arms ρ1 and ρ2 being very different. Because of this configuration of the three levers 26', 30' and 33', the pitch levers 24'e and 25'e project on the other side of the cuff 24' or 25' by comparison with the position of FIG. 2. Each pitch lever 24'e or 25'e is thus housed in the space delimited between the first and third levers 26' and 33', the hub 23' and the corresponding cuff such as 24'.

FIGS. 6a to 6e diagrammatically represent five possible configurations. It will be noted that the configuration of FIG. 6a corresponds to that of FIG. 5 (just one drag damper 27' on the first lever 26' whose pivoting link 36' to the third lever 33' is radially outside the pivoting link 37' between the second lever 30' and this same lever 33', the levers 30' and 33' being fixed-length connecting rods), and that the configuration of FIG. 6b corresponds to that of FIG. 1 and is similar to that of FIG. 2. For this reason, the elements in FIG. 6b are identified by the same references as the corresponding elements of FIG. 1.

The configuration of FIG. 6c corresponds to an alternative form of FIG. 6b, in which the first lever 6' with the drag damper 7' is mounted in pivoting fashion on the third lever 13' by a pivoting link 16' coaxial with the pivoting link 17' connecting the second lever 10' to the third one 13'. As far as the rest is concerned, the articulations of the levers 6', 10' and 13' by the ball joints 8, 11 and 14 respectively to the first and second cuffs 4 and 5 and to the hub 3 are unchanged.

The configuration of FIG. 6d is another alternative form in which the first and second levers 46 and 50 are each a fixed-length connecting rod and are connected by pivoting links 56 and 57, radially offset as in the example of FIG. 6a, to the third lever 53 which is equipped with a drag damper 47. As far as the rest is concerned, in this case too, the three levers 46, 50 and 53 are articulated by the ball joints 8, 11 and 14 respectively to the cuffs 4 and 5 and the hub 3.

Finally, the configuration of FIG. 6e is an alternative form of the example of FIG. 6b, in which the only difference is that the fixed-length connecting rod constituting the second lever 10 has been replaced by a second lever 60 comprising a second drag damper 67 which is straight and of a structure similar to that of the damper 7 of the first lever 6.

Other configurations are possible, for example with two dampers, one being on one of the first or second levers, and the other on the third lever, or alternatively with three dampers, one damper being mounted on each of the three levers.

It is just as possible to mount the drag damping device of the invention on a rotor the hub of which does not have a single cavitied plate, but two plates spaced one above the other, and between which the articulation means are held by through-bolts fixed to the plates and to a radially outer armature of the articulation means, these through-bolts passing through openings made in the branches of the inner clevis of the cuff, in the cuff itself or in the superimposed plates forming it, as appropriate.

Likewise, the member for linking each blade to the hub may be not a member distinct from the blade, but the forked root of this blade, which forked root may straddle a cavitied plate hub to which it is connected by articulation means housed in a cavity and held, on the one hand, on the outer edge of this cavity and, on the other hand, on the branches of the forked root by radially outer and radially inner armatures respectively of these articulation means, such as a laminated spherical stop.

Despite adding to the number of components at the rotor head, by comparison with the embodiments of the state of the art, the device of the invention makes it possible to solve the two types of problem posed by ground resonance and transmission resonance. In addition, it gives great freedom of adjustment, especially of the two equivalent stiffnesses K0 and K1 mentioned hereinabove, during flight trials, possibly keeping the same damper. This adjustment in addition makes it possible to free up some of the safety margins regarding ground-resonance problems that any helicopter may encounter at the time of various increases in its design weight.

I claim:

1. Device for damping the drag of the blades of a rotor of a rotorcraft, in particular of a helicopter main rotor or conventional tail rotor, having at least three blades each connected by a respective linking member to a rotor hub driven in rotation about an axis of rotation of the rotor, wherein between two neighbouring blades of the rotor, there are:

a first lever articulated by a first ball joint to said linking member of a first of the two blades, a second lever articulated by a second ball joint to said linking member of the second of the two blades, and a third lever articulated by a third ball joint to the hub between said linking members of the two blades and extending between said linking members and laterally towards the outside of the hub, the first and second levers being articulated to the third lever by a first pivoting link and a second pivoting link, respectively, about axes of pivoting parallel to one another and substantially perpendicular to the plane defined by the centres of the three ball joints, and at least one of the three levers comprising at least one drag damper for said two blades.

2. Drag damper device according to claim 1, wherein the first and second ball joints are held on the side, turned towards said third lever, of the respective linking member, said third lever extending substantially radially with respect to the axis of rotation of the rotor, to which the two axes of pivoting are substantially parallel.

3. Drag damper device according to claim 1, wherein each damper comprises elastic return means of a given stiffness.

4. Drag damper device according to claim 1, wherein the two axes of pivoting are coincident.

5. Drag damper device according to claim 1, wherein the two axes of pivoting are radially offset with respect to each other and with respect to the axis of rotation of the rotor.

6. Drag damper device according to claim 1, wherein the third lever comprises a drag damper.

7. Drag damper device according to claim 1, wherein at least one of the first and second levers comprises a substantially straight drag damper.

8. Drag damper device according to claim 7, wherein each of the first and second levers comprises a substantially straight drag damper, and the third lever is a connecting rod.

9. Drag damper device according to claim 1, wherein a single lever comprises a drag damper, and the other two levers are each a connecting rod.

10. Drag damper device according to claim 1, wherein the third ball joint is held in a lateral clevis attached to the hub.

11. Drag damper device according to claim 1, wherein the first and second pivoting links each comprise a clevis at one end of the first lever and one end of the second lever respectively, and by means of which each of them is mounted in pivoting fashion on the third lever.

12. Drag damper device according to claim 1, for a rotor in which each member for linking a blade to the hub is a member designed as a double clevis, having a radially outer clevis holding the corresponding blade by its blade root, and a radially inner clevis connected to the hub by a retaining and articulating means allowing angular deflections of said linking member with respect to the hub at least about an axis of drag of the corresponding blade, said linking member also bearing, as a lateral projection, a lever for controlling the pitch of the corresponding blade, wherein said linking member also has two lateral clevises each projecting respectively from one of its two sides and holding respectively one of the ball joints for the articulation of a first lever and of a second lever, at least one of said lateral clevises being radially on the outside of said pitch lever with respect to the axis of rotation of the rotor.

* * * * *